June 12, 1951  D. L. ELAM  2,556,471
ELECTRONIC INDICATING SYSTEM
Filed Feb. 28, 1947  3 Sheets-Sheet 2
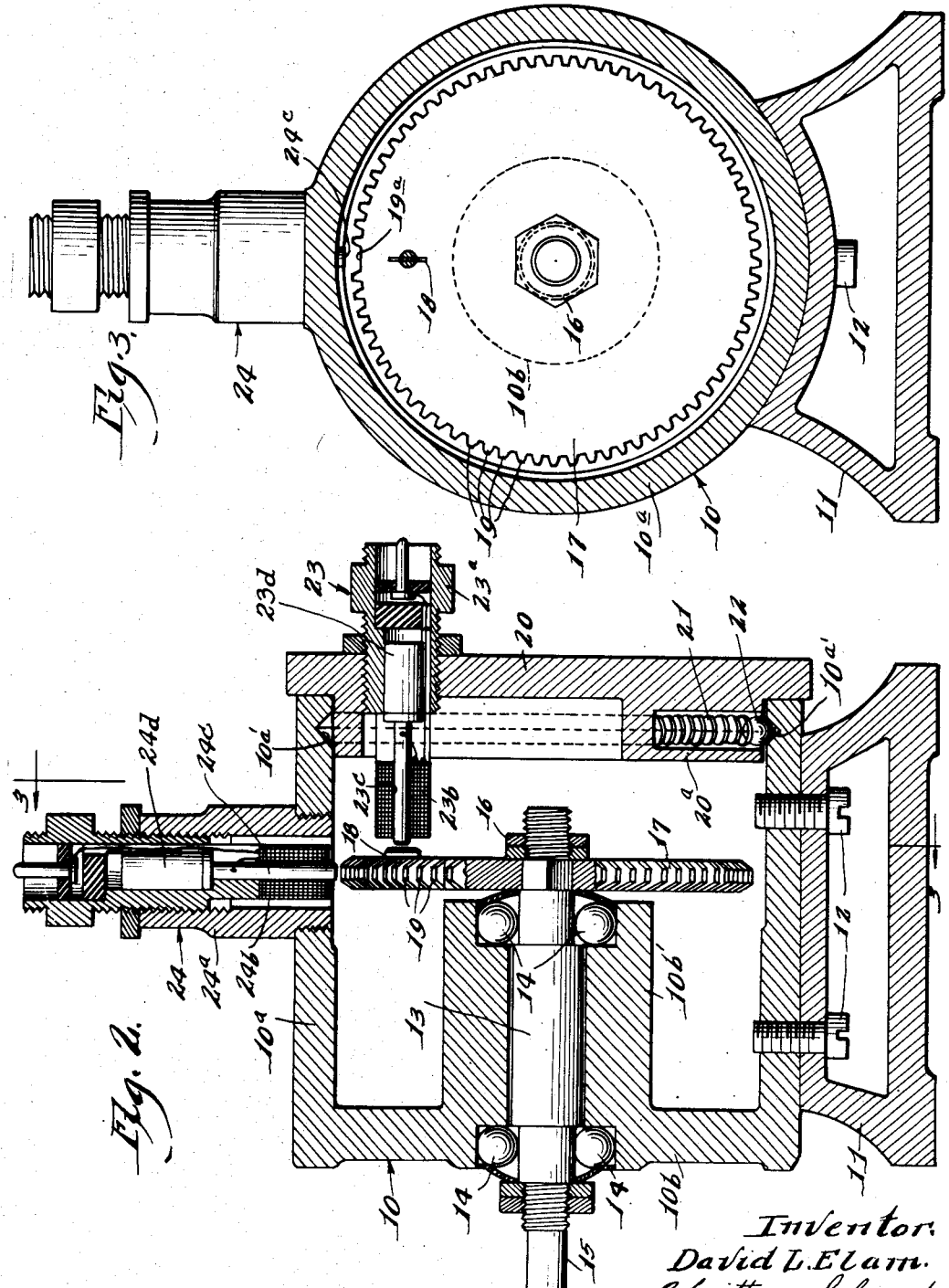
Inventor:
David L. Elam.
Chritton, Schroeder,
By Merriam & Hofgren
Attorneys

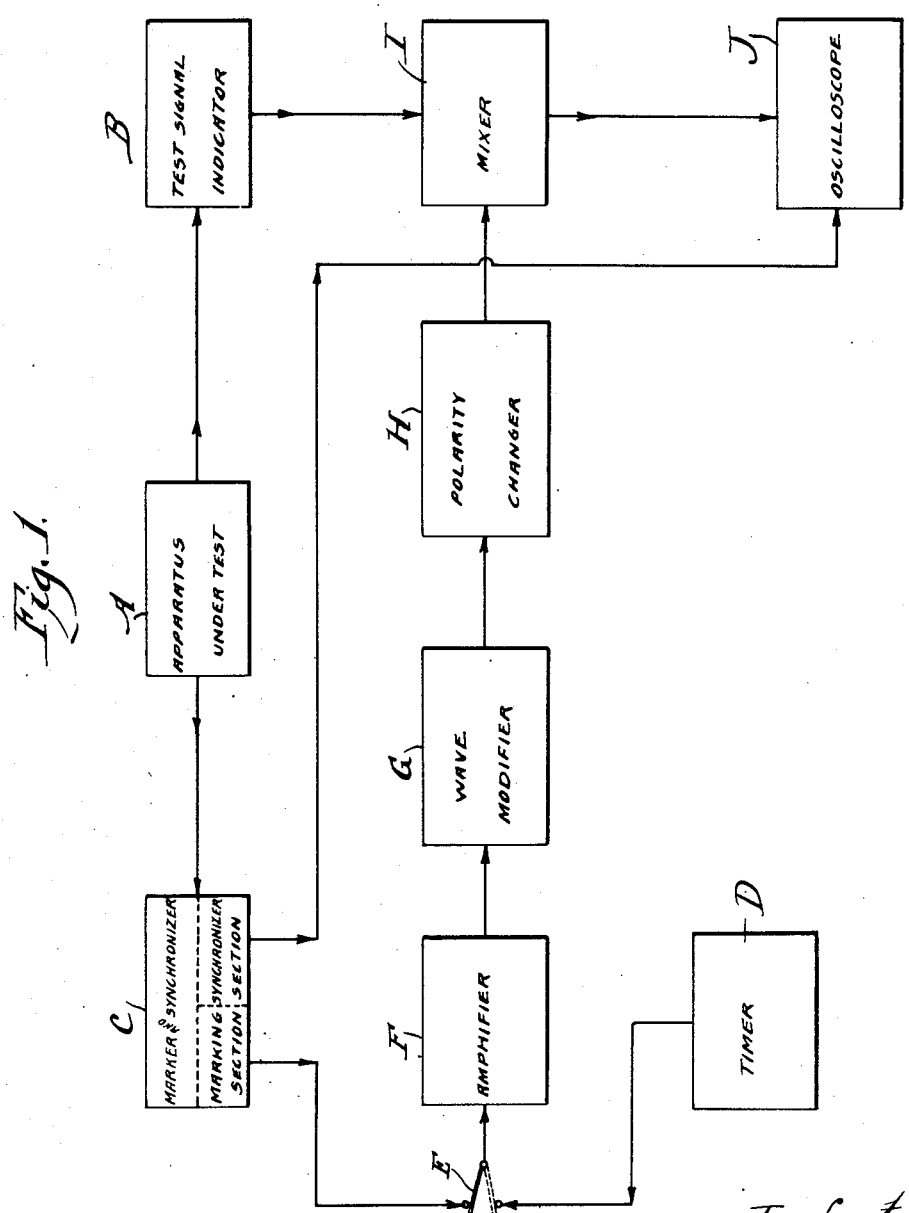

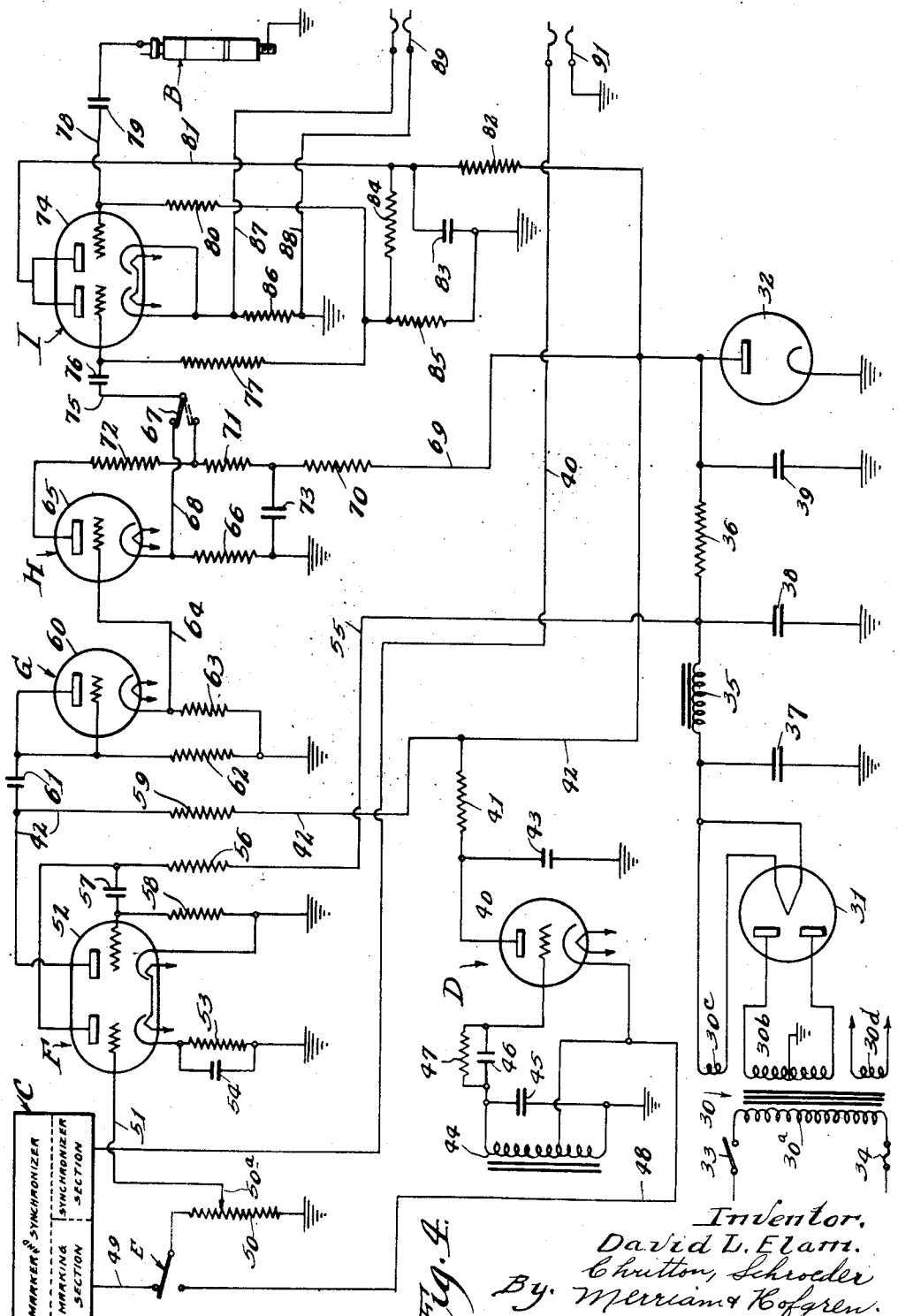

Patented June 12, 1951

2,556,471

UNITED STATES PATENT OFFICE 2,556,471

ELECTRONIC INDICATING SYSTEM

David L. Elam, Roselle, Ill., assignor to Electro Products Laboratories, Inc.

Application February 28, 1947, Serial No. 731,566

3 Claims. (Cl. 171—209)

This invention relates to an electronic indicating system, and more particularly to a system for providing an electrical indication of a mechanical movement.

Means have heretofore been devised for providing an electrical indication of a mechanical variation, as for example a pressure variation in a cylinder of an internal combustion engine, or movement of a valve stem in a Diesel injector, an apparatus for translating such mechanical variations into electrical variations having been disclosed in the patent to Kamler and Elam issued March 19, 1946 as Patent No. 2,396,703. Somewhat different indicating means are also disclosed in my co-pending application for a "Detonation Indicator," filed February 21, 1946 as Serial No. 649,361, now Patent No. 2,508,996, and an improved electronic indicator is shown in my co-pending application, filed November 1, 1946 as Serial No. 707,130.

In using apparatus for translating a mechanical variation into an electrical variation, such as the apparatus shown in the above mentioned patent and pending applications, the electrical variation is often made to appear as a visual indication, as for example on the screen of a conventional oscilloscope. It has been found desirable to synchronize this visual indication with the mechanical movement associated with the pressure or other mechanical variation of the apparatus under test in order that the visual indication appearing on the oscilloscope screen may be held stationary, and it is also desirable to provide marker indications to be used in conjunction with the above mentioned electrical indication.

For example, in testing the detonation characteristics of an internal combustion engine it is often desirable to synchronize the image having the detonation characteristics of the engine with the rotation of the engine at some desired point in the cycle of rotation so that the image is stationary on the oscilloscope screen, and it may also be desirable to provide a marking indication giving a reference point, as for example, an indication of when the piston is at top dead center within its cylinder or is in some other position with respect to top dead center in the cylinder. It may also be desirable to provide marking indications which reoccur at desired degrees of rotation of the engine or at desired time intervals, and to combine these marking indications with the electrical variations derived from the mechanical variations under test to provide a combined indication.

I have devised and am here disclosing and claiming an electronic indicating system for use with pickup means for translating pressure variations into electrical variations, as for example a pickup such as disclosed in the above mentioned patent and pending applications, my present invention providing a means for synchronizing said electrical variations and the mechanical movement associated therewith so that the visual indication which is obtained may be held stationary on the screen of an oscilloscope. My present invention also includes means for providing first marking indications which vary as a function of the mechanical movement involved, and second marking indications which are spaced from each other at desired time intervals, and means actuated by said electrical variations and said marking indications for providing a combined indication.

Other features and advantages of the present invention will be apparent from the following specification and from the drawings, in which:

Figure 1 is a block diagram of an electronic indicating system according to my invention;

Figure 2 is a longitudinal vertical section through apparatus designed to provide marking and synchronizing indications for use with my invention;

Figure 3 is a vertical cross section through the apparatus of Figure 2, taken on the line 3—3 of Figure 2; and Figure 4 is a schematic diagram of one circuit which I have devised in accordance with the block diagram of Figure 1.

Referring now to Figure 1, the apparatus under test, which may comprise an internal combustion engine or other device having a cyclical mechanical movement associated with pressure variations, is shown in diagrammatic form at A. A test signal indicator B is associated with the apparatus under test, the signal indicator being utilized to translate pressure variations occurring within the apparatus under test into electrical variations, and may comprise a pickup device of the type disclosed in the above mentioned issued patent or pending applications.

A marker and synchronizer C is also associated with the apparatus under test, this marker and synchronizer being designed to provide an electrical synchronizing impulse at a given point in each cycle of mechanical movement, this point being variable throughout the cycle, and to provide first electrical marking impulses which are developed as a function of said mechanical movement. The marking section of the marker and synchronizer may also provide a modified indication at one or more points in each cycle of mechanical movement as will be more fully hereafter explained.

The timer D is designed to provide second electrical marking impulses spaced from each other at desired time intervals, and means, including the switch E are provided for selecting the desired one of said first and second marking impulses. The selected impulses are delivered to an amplifier F, and the amplified output is delivered to a wave modifier G which converts the impulses from a substantial sine wave form to the form of a pip or sharply peaked pulse. The polarity changer H is provided in order that the impulses from the wave modifier may be given a positive or negative polarity as desired, and these impulses of desired polarity are utilized in conjunction with the electrical variations from the test signal indicator to actuate a mixer I, the output of this mixer being utilized to provide a combined indication on the screen of an indicating means which may be the oscilloscope J. Synchronizing impulses from the synchronizer section of the marker and synchronizer are also applied to the oscilloscope in such manner that it holds the image from the mixer I stationary on the oscilloscope screen.

Inasmuch as the first step in the operation of my indicating system constitutes the development of marking and synchronizing impulses, the novel apparatus illustrated in Figures 2 and 3 and operable to develop the desired synchronizing and marking impulses will first be explained in detail.

The marker and synchronizer C comprises a generally cylindrical housing 10 mounted on a base 11 by means of the studs 12. The housing 10 has a metallic side wall member 10a and a rear end member 10b, this last member having an inwardly extending mounting flange 10b'. A shaft 13 is journaled through this flange and extends into the housing, this shaft being mounted for rotation by means of the bearing 14, and being adapted to be coupled to the apparatus under test so that the shaft 13 rotates as a function of the mechanical movement of the apparatus under test.

In Figure 2 a second shaft 15 is shown coupled to the shaft 13, and this second shaft may be connected to the main drive shaft of the engine or other apparatus under test. When the apparatus under test is so constructed that the main drive shaft does not complete one cycle of rotation for every cycle of the mechanical variation being measured, as for example, in the case of a four cycle engine, it may be desirable to couple the apparatus of Figure 2 to the cam shaft rather than the main drive shaft of the engine.

A rotatable member is secured to the shaft 13 by means of the lock nuts 16. While this rotatable member may take various forms, as the form of a drum, for example, it is shown as comprising the disk-like member 17 of Figures 2 and 3, said member being adapted to be rotated as a function of the mechanical movement associated with the pressure variations in the engine. A primary actuating projection 18 extends from the face of the disk-like member, this projection preferably being of a magnetic material and being substantially spaced from the axis of rotation of the disk. As shown in Figure 3 the projection 18 is in the form of a blade, arranged substantially radial of the disk-like member, and while other forms are suitable for this member, it is important that at least the portion of said projection which extends outwardly (to the right in Figure 2) from the face of this disk occupies only a very small angle of arc on the face of the disk—that is, if lines are drawn from the axis of rotation of the disk to the farthest point on each side of the projection 18, these lines will define only a very small angle.

The peripheral portion of the disk is divided into a plurality of equal angular sections, there being seventy-two such sections in the apparatus illustrated in Figure 3, and a majority of said sections each have a secondary projection 19 thereon, but at least one of said sections has a projection omitted therefrom, as at 19a. It will be readily seen that during the course of one rotation of the disk-like member 17 the projection 18 will pass a given point only once, but one of the secondary projections 19 will pass a given point every five degrees of rotation of the disk-like member, except that there will be one five degree space where no projection passes such point because one of the projections is omitted at 19a.

A plate 20 covers the front of the housing 10, this plate being frictionally held for rotation with respect to said housing about the same axis as the shaft 13. In order to accomplish this frictional mounting I provide a groove 10a' around the inner surface of the side member 10a and provide the front plate 20 with at least one spring 21 and ball 22 adapted to cooperate with the groove 10a'. In one embodiment of my invention which I have constructed I have obtained very satisfactory results by providing three such spring and ball members, each held in place by means of a cup-shaped flange 20a on the interior of the plate 20 and preferably integral therewith.

Journaled through the front plate 20 and extending into the interior of the housing 10 is a pickup 23 of the type disclosed in the aforementioned patent to Kamler and Elam No. 2,396,703, although it will be understood that other pickups, as for example, an electronic indicator of the type disclosed in my application Serial No. 707,130, or any one of various other means for developing an electrical impulse may be utilized if desired. Since a complete description of the pickup 23 may be found in the aforementioned patent, the pickup unit will not be described in detail here, but will be only generally described as comprising a metallic housing 23a, an inductance member 23b and a fixed member of permeable material 23c, the enlarged inner end of which abuts the end of a cylindrical permanent magnet 23d. This fixed member is spaced from the axis of rotation from the disk-like member 17 a distance equal to the spacing of projection 18 and is so arranged that as the disk-like member rotates the projection 18 passes closely adjacent the fixed member 23c once during each cycle of rotation, and an electrical impulse is developed by the pickup member in the manner described in the above mentioned patent, variation in the spacing of the air gap between the member 23c and the projection 18 as the disk 17 rotates to pass the projection 18 closely adjacent the end of the member 23c, varies the number of lines of flux threading the inductance 23b and thus creates a voltage differential in the inductance which is a function of the speed of rotation of the disk 17.

Since the pickup 23 operates by means of a varying magnetic field, it is essential that at least that portion of the projection 18 which passes closely adjacent the fixed member 23c be made of magnetic material when this particular pickup is used. However, it will be noted that should a pickup such as is illustrated and described in my application Serial No. 707,130 be substituted in place of the particular pickup illustrated, the apparatus would operate on electrical rather than magnetic principles, and in this event the projecting member 18 need only be of electrically conducting material. The member 23c is referred to herein as a "fixed member," and it will be understood that while it is normally in a fixed position during operation of the device, rotation of the plate 20 will move this member to a position where the projection 18 passes closely adjacent said member at a different point in the cycle of rotation of the projection 18.

A similar pickup device 24 comprising a metallic casing 24a, an inductance member 24b a fixed member 24c and a permanent magnet 24d is mounted in the side member 10a in such manner that the fixed member 24c extends to a point closely adjacent the path of travel of the secondary projections 19 so that as the disk is rotated one of the equal angular sections upon which the projections 19 are mounted passes closely adjacent the fixed member 24c every 5 degrees of rotation of the member 17.

It will be readily seen that if the disk-like member 17 is rotated as a function of a mechanical movement, as for example, as a function of the rotation of the shaft of an engine, the pickup 23 will develop one electrical impulse at some point in each cycle of rotation of the disk-like member, since the pickup member is adapted to be actuated as a function of the spacing between the fixed member 23c and the actuating projection 18. The point during the cycle of rotation where this impulse is developed will depend upon the position to which the plate 20 has been manually rotated, this plate being rotatable through a full 360 degrees and being frictionally held in position after it is manually rotated. Similarly an electrical impulse will be developed by the pickup 24 each time the disk rotates through 5 degrees to pass one of the secondary projections 19 closely adjacent the fixed member 24, and a modified marking indication will be developed when the section 19a passes closely adjacent the fixed member 24c, since a secondary projection has been omitted from said section.

In operation, when the shaft 13 is coupled to the engine shaft, the section 19a from which a projection has been omitted may be set immediately below the fixed member 24c when the piston in the apparatus under test is exactly at top dead center or at some other desired position, and in this event a modified indication will be given during each cycle of rotation when the piston is at top dead center or in the other desired position above referred to, and a marking impulse will be developed to indicate each 5 degrees of rotation of the engine shaft from said desired position.

Obviously the number of secondary projections 19 may be changed to give a different number of marking impulses during each cycle of revolution of the member 17, and if desired additional projections may be omitted to give more than one modified indication, or additional projections may be placed upon other portions of the rotatable member in such manner as to give additional indications. Similarly, while I have shown only one primary projection 18 and the apparatus shown in Figures 2 and 3 will provide only one synchronizing impulse during each cycle of rotation of the member 17, if desired, additional primary projections may be added at desired points upon the face of the disk to provide more than one impulse for each cycle of rotation or the ratio of rotation of the disk 17 with respect to the occurrence of pressure variations in the engine may be changed to provide synchronizing impulses which occur at some multiple or sub-multiple of the pressure variation occurrences.

Figure 4 is a schematic diagram of an operable apparatus constructed in accordance with Figure 1, the circuits of Figure 4 being designed to provide second marking impulses spaced from each other at desired time intervals; to provide means for selecting either the first marking impulses from the marker and synchronizer or the second marking impulses from the timer; to provide means for amplifying and modifying said selected impulses; to provide means selectively operable to change the polarity of said selected impulses; and to provide means actuated by the electrical variations from the test signal indicator B and the selected impulses for providing a combined indication.

I have found that the shape of the electrical impulses which are obtained from the marking section of the marker and synchronizer when a large number of secondary actuating projections 19 are used and the disk 17 is rotated at a relatively high speed, is not a sharp pulse, but is essentially a sine wave. This may be caused because the mechanical changes are more rapid than the natural period of the electrical components involved, or are faster than the magnetic field can follow through the material used in the magnetic circuit. Whatever the reason, a sine wave is not suitable as a marker pulse, so it is necessary to modify the impulses obtained from the marking section to provide marking impulses or pips which are sharply peaked.

Since it is necessary to modify the first impulses obtained from the marking section of the marker and synchronizer, I prefer to use a simple sine wave oscillator to provide the second marking impulses which are spaced at desired time intervals, and to provide means to select one of said first or second marking impulses, such means being so arranged that in the event the second marking impulses are selected they may be amplified and modified in the same circuit which is utilized to amplify and modify the first marking impulses obtained from the marking section of the marker and synchronizer.

In Figure 4 the necessary actuating voltages for the electronic components of my indicating system are developed in a power supply comprising a transformer 30, a rectifier tube 31, a filter circuit, and a voltage regulator tube 32.

The primary 30a of the transformer 30 is adapted to be connected to a suitable source of electrical energy, which may be a conventional commercial 110 volt 60 cycle alternating current supply, this connection being made through the on-off switch 33 and the fuse 34. The transformer includes a high voltage center grounded secondary 30b having its ends connected to the two plates of a full wave rectifier tube 31, which may be of tube type No. 5Y3G. A low voltage winding 30c supplies cathode current for the rectifying tube, and another low voltage secondary 30d is adapted to supply cathode-filament current for the tubes of the other electronic portions of the apparatus, the leads connecting this filament supply to each of the tubes being omitted for the sake of clarity and simplicity in the drawing.

The positive rectified output of the rectifier tube 31 is here shown as being developed through a filter arrangement comprising the choke 35 which may have a value of 10 henrys and the resistor 36 which may have a value of 2,000 ohms, to the plate of a voltage regulating tube 32 which may be of tube type No. VR150, this tube having its other terminal or cathode grounded. The desired filter effect is obtained by associating with the tube 32 the elements 35 and 36 and the filter condensers 37, 38, and 39 each of which may have a value of 10 microfarads and each of which are connected between the high voltage lead and ground in the manner shown. A regulated source of plate or B plus voltage maintained substantially constant at 150 volts is thus provided at the plate of the tube 32, while a somewhat higher voltage may be taken off from a point between the choke 35 and the resistor 36.

The timer D which is used to develop second marking impulses spaced from each other by desired time intervals comprises an oscillator including the tube 40 which may be of tube type No. 6J5, and which includes cathode, grid and plate elements. The plate is connected to the regulated high voltage supply through the resistor 41 and the lead 42, the by-pass condenser 43 being provided in said circuit to pass the oscillations which are developed around the regulated voltage supply. The oscillator circuit associated with the tube 40 is of a conventional type using a tapped inductance 44 which may comprises approximately 400 turns of No. 30 wire with a cathode tap at approximately 133 turns, the inductance wire being preferably wound on a transformer iron core having laced plates. A fixed capacity 45 which may have a value of .11 microfarad is shunted across the inductance 44, the lower end (in the drawing) of this tuned circuit being connected to ground and the upper end of the tuned circuit being connected to the grid of the tube 40 through the grid leak arrangement comprising the condenser 46, which may have a value of .25 microfarad, and the resistor 47, which may have a value of 100,000 ohms.

With circuit values as described herein this oscillator provides electrical marking impulses of substantial sine wave form with a frequency of approximately 1,000 cycles per second. If desired the resistor 47, or one or more of the other circuit components may be made variable to trim the oscillator to a desired frequency. The lead 48 extends from the cathode tap of the oscillator to one terminal of the switch E, another terminal of this switch being connected to the source of first marking impulses developed in the marking section of the marker and synchronizer, and in the arrangement illustrated this terminal of the switch is connected by means of the lead 49 to the output terminal of the pickup member 24 of Figure 2.

It will be seen that the switch E is operable to select either the first marking impulses developed by said marker section or the second marking impulses developed by the timer D, and the selected one of these marking impulses develop a voltage across the potentiometer 50 which is connected between the movable member of the switch E and ground. The adjustable member 50a of the potentiometer 50 is connected by means of the lead 51 to the input grid of an amplifier section F comprising the tube 52 which may be of tube type No. 6SN7. This tube comprises a double triode, the tube having two sections each including cathode, grid and plate elements, although it will be understood that if desired separate tubes may be used, or a different number of amplifying sections may be utilized.

The cathode of the input section of the tube 52 is connected to ground through the cathode resistor 53 which may have a value of 2,000 ohms and is shunted by the condenser 54 which may have a value of .25 microfarad. The plate of this section of the tube is connected to the B plus supply at a point between the choke 35 and the resistor 36 by means of the lead 55 which incorporates the plate resistor 56 which may have a value of 100,000 ohms, and amplified impulses from the output circuit of this section of the tube are coupled to the input grid of the other or right hand (in the drawing) section of the tube through the coupling condenser 57 which may have a value of .1 microfarad, the grid leak resistor 58 which may have a value of 50,000 ohms being included between the grid and ground in the conventional manner.

The cathode of this section of the tube is connected directly to ground, and the plate is connected to the regulated voltage supply through the lead 42 which incorporates the plate resistor 59 which may have a value of 5,000 ohms. The amplified impulses developed in the output circuit of this tube are coupled to the anode circuit of a gas filled thyratron type tube 60 through the coupling condenser 61 which may have a value of .005 microfarad, the coupling arrangement also including the relatively high value resistance 62 which is shunted between the anode circuit of the tube and ground, and may have a value of 1 megohm. The tube 60 may be of tube type No. 884 and has its grid and plate connected together to form an anode circuit and its cathode connected to ground through the relatively low value resistance 63 which may have a value of 1,000 ohms, and across which the output of the tube is taken by means of the lead 64. The tube 60 is so arranged in the circuit that it normally is non-conductive, but is adapted to be rendered conductive by the positive voltage change in the output circuit of the amplifier tube 52. As the essentially sine wave form signal in the output circuit of tube 52 swings through the positive half of its cycle the condenser 61 becomes charged much faster than its charge can leak off through the resistor 63, and at some point before the peak of the positive half cycle is reached the charge on condenser 61 becomes sufficient to cause tube 60 to fire, and the condenser 61 discharges through the tube. This circuit, which is identified in Figure 1 as G acts to modify the sine wave input, and the output developed across the resistor 63 takes the form of pips or sharply peaked impulses.

These impulses are coupled through the lead 64 to the input of a polarity changer H which comprises a tube 65 which may be of tube type No. 6J5, having cathode, grid and plate elements. In using my electronic indicating system it may be desirable in certain instances to have marker impulses either above or below the base line—i. e. either of a positive or a negative polarity—and the circuit indicated generally at H has been devised to be selectively operable to reverse the polarity of the impulses. To obtain this result I arrange the circuit in such manner that outputs of substantially equal amplitude may be obtained from the cathode and the plate circuits of such tube. The cathode of the tube is connected to ground through the resistor 66 which may have a value of 1,000 ohms, and a cathode output is obtained across this resistor and connected to one terminal of the switch 67 by means of the lead 68. As will be apparent to those skilled in the art this cathode output will be of the same phase as the impulses delivered to the grid of the tube.

The plate of the tube is connected to the regulated B plus supply by means of the lead 69 which incorporates the voltage dropping resistor 70 which may have a value of 100,000 ohms, and the voltage divider comprising the resistor 71 which may have a value of 100 ohms and the resistor 72 which may have a value of 2,000 ohms. The pulsating component of the plate current of the tube is by-passed to ground between the voltage divider network and the voltage dropping resistor 70 by means of the condenser 73 which may have a value of 1 microfarad.

Since the amplification factor of a tube of this type connected as shown is equal to 20, the pulsating voltage developed in the plate circuit of the tube is normally twenty times as great as the pulsating voltage developed in the cathode circuit of the tube. Therefore, in order to obtain equal voltage outputs from the plate and the cathode circuits of the tube, I obtain the plate output from across the resistor 71 only, this resistor having a value of only approximately ½₀th of the total plate load which comprises the resistors 71 and 72, and these cathode and plate outputs, which are of substantially equal amplitude, are selectively coupled to the input circuit of the mixer I through the switch 67, the cathode output (which is of the same phase as the input to tube 65) being selected when the switch is in the position shown in solid lines in Figure 4, and the plate output (which is 180 degrees out of phase with respect to the input of the tube 65) being selected when the switch is in the position shown in dotted lines in Figure 4.

The mixer circuit I is adapted to be actuated by the electrical variations developed by the test signal indicator B, (which may be an indicator of the type disclosed in the earlier mentioned patent and pending application, and which may include electronic circuits of the type disclosed in the above mentioned pending applications) and by the selected marking impulses which are developed through the apparatus hereinabove described. While the mixer I is illustrated as comprising a true electronic mixer, it will be understood that if desired other arrangements, as for example, an electronic switch, may be utilized wherein there is not true mixing action, but the two actuating impulses are developed alternately, but in such manner as to provide a combined indication.

In the circuit illustrated the mixer comprises a tube 74 which may be of tube type No. 6SN7 having two sections each containing cathode, grid and plate elements, although it will be understood that separate tubes may be used in place of the double triode if desired. The selected marking impulses are delivered to one grid of the tube by means of the lead 75 which is connected to the movable element of the switch 67 and which incorporates the coupling condenser 76 which may have a value of .05 microfarad, the grid leak resistor 77 which may have a value of 1 megohm being provided in this coupling arrangement. Similarly the output of the test signal indicator B is connected to the other grid of the tube 74 through the lead 78 which incorporates the coupling condenser 79 which may have a value of 1 microfarad, the grid leak resistor 80 which may have a value of 1 megohm being provided in this coupling arrangement.

The plates of each section of the tube 74 are joined together and are connected to the regulated B plus supply through the lead 81 which incorporates the resistor 82 which may have a value of 1,000 ohms, a usual by-pass condenser 83 being connected between the plate circuit and ground, this condenser preferably having a value of about 20 microfarads. In order to obtain the proper plate voltage for the tube 74 a voltage divider arrangement is provided including the resistor 82 and the resistors 84 and 85 which may have respective values of 50,000 ohms and 10,000 ohms, and each of the grids of the tube are connected through the above mentioned grid leak resistors 77 and 80 to a point on the voltage divider between the resistors 84 and 85 so that a positive bias voltage may be applied to the grids of the tube, this voltage being preferably of a value approximating 15 volts.

The output of the tube 74, containing a combination of the electrical variations developed by the test signal indicator B and the selected marking impulses, is taken off across the cathode resistor 86 which may have a value of 1,000 ohms, and this combined output may be delivered to an indicating means, as for example, to the vertical deflection plates of an oscilloscope, the leads 87 and 88 which terminate in the jack 89 being shown for this purpose, and means for utilizing the synchronizing impulse developed in the marker and synchronizer C are here shown as the lead 90 terminating in the jack 91, this jack being adapted to be connected to the synchronizer input terminal of an oscilloscope.

While I have shown and described certain embodiments of my invention, it is to be understood that it is capable of many modifications. Changes, therefore, in the construction and arrangement may be made without departing from the spirit and scope of the invention as disclosed in the appended claims.

I claim:

1. Apparatus of the character described for providing an electrical indication of a repeating mechanical movement, including: a disk-like rotatable member having only a single primary actuating projection extending from the face thereof and a plurality of secondary actuating projections extending from the periphery thereof, said primary projection being substantially spaced from the axis of said disk-like member, and said secondary projections being equally angularly spaced around at least a substantial portion of the periphery of said disk-like member and wherein at least one secondary projection is omitted from its position; a first means for developing an electrical impulse, such means including a first fixed member, and being adapted to be electrically actuated as a function of the spacing between said fixed member and said primary actuating projection; a second means for developing an electrical impulse, such means including a second fixed member, and being adapted to be electrically actuated as a function of the spacing between said second fixed member and said secondary actuating projections; means operable as a function of said mechanical movement for rotating said disk-like member to pass said primary actuating projection closely adjacent said first fixed member to actuate said first impulse developing means, and to pass said secondary actuating projections closely adjacent said second fixed member to actuate said second impulse developing means.

2. Apparatus of the character described for providing an electrical indication of a repeating mechanical movement, including: a rotatable member having a circular periphery and having only a single primary actuating projection extending from one portion thereof and a plurality of secondary actuating projections extending from said periphery, all said projections being substantially spaced from the axis of said rotatable member and said secondary projections being equally angularly spaced around at least a substantial portion of the periphery of said rotatable member and one secondary projeciton being omitted from its position; a first means for developing an electrical impulse, such means including a first fixed member, and being adapted to be electrically actuated as a function of the spacing between said fixed member and said primary actuating projection; a second means for developing an electrical impulse, such means including a second fixed member, and being adapted to be electrically actuated as a function of the spacing between said second fixed member and said secondary actuating projections; and means operable as a function of said mechanical movement for rotating said rotatable member to pass said primary actuating projection closely adjacent said first fixed member to actuate said first impulse developing means, and to pass said secondary actuating projections closely adjacent said second fixed member to actuate said second impulse developing means, whereby one of these latter impulses per revolution is of different character than the others.

3. Apparatus of the character described for providing an electrical indication of a repeating mechanical movement, including: a rotatable member having a circular periphery and having only a single primary actuating projection extending from one portion thereof and a plurality of secondary actuating projections extending from said periphery, all said projections being substantially spaced from the axis of said rotatable member and said secondary projections being equally angularly spaced around at least a substantial portion of the periphery of said rotatable member and one being of different dimensions than the others; a first means for developing an electrical impulse, such means including a first fixed member, and being adapted to be electrically actuated as a function of the spacing between said fixed member and said primary actuating projection; a second means for developing an electrical impulse, such means including a second fixed member, and being adapted to be electrically actuated as a function of the spacing between said second fixed member and said secondary actuating projections; and means operable as a function of said mechanical movement for rotating said rotatable member to pass said primary actuating projection closely adjacent said first fixed member to actuate said first impulse developing means, and to pass said secondary actuating projections closely adjacent said second fixed member to actuate said second impulse developing means, whereby one of these latter impulses per revolution is of different character than the others.

DAVID L. ELAM.

REFERENCES CITED

The following references are of record in the file of this patent:

UNITED STATES PATENTS

| Number | Name | Date |
| --- | --- | --- |
| 276,136 | Drawbaugh | Apr. 17, 1883 |
| 591,162 | Fiske | Oct. 5, 1897 |
| 1,056,360 | Podlesak | Mar. 18, 1913 |
| 1,081,696 | Remy | Dec. 16, 1913 |
| 1,178,089 | Mason | Apr. 4, 1916 |
| 1,687,233 | Stoller | Oct. 9, 1928 |
| 1,839,075 | Young | Dec. 29, 1931 |
| 2,069,780 | Severy | Feb. 9, 1937 |
| 2,082,030 | Schrader et al. | June 1, 1937 |
| 2,085,203 | Schlesman et al. | June 29, 1937 |
| 2,110,144 | Durkee | Mar. 8, 1938 |
| 2,221,814 | Reid | Nov. 19, 1940 |
| 2,231,118 | Guenther | Feb. 11, 1941 |
| 2,281,441 | Horton, Jr., et al. | Apr. 28, 1942 |
| 2,349,560 | Reijnst | May 23, 1944 |
| 2,355,047 | Bennett | Aug. 8, 1944 |
| 2,396,703 | Kamler | Mar. 19, 1946 |
| 2,424,999 | Ostlund | Aug. 5, 1947 |
| 2,457,562 | Karleen | Dec. 28, 1948 |